(12) United States Patent
Kahalon et al.

(10) Patent No.: US 12,147,716 B2
(45) Date of Patent: Nov. 19, 2024

(54) METHODS AND SYSTEMS FOR INTER-STACK COMMUNICATION FOR LOGICAL VOLUME MANAGEMENT

(71) Applicant: MELLANOX TECHNOLOGIES, LTD., Yokneam (IL)

(72) Inventors: Omri Kahalon, Yokneam (IL); Gal Shalom, Givat Avni (IL); Aviad Yehezkel, Yokneam Ilit (IL); Liran Liss, Atzmon-Segev (IL); Oren Duer, Kohav Yair (IL); Rabie Loulou, Nazareth (IL); Maxim Gurtovoy, Tel Aviv (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 112 days.

(21) Appl. No.: 17/586,417

(22) Filed: Jan. 27, 2022

(65) Prior Publication Data

US 2023/0236769 A1 Jul. 27, 2023

(51) Int. Cl.
*G06F 3/00* (2006.01)
*G06F 3/06* (2006.01)
(52) U.S. Cl.
CPC .......... *G06F 3/0689* (2013.01); *G06F 3/0613* (2013.01); *G06F 3/0631* (2013.01); *G06F 3/0659* (2013.01); *G06F 3/067* (2013.01)

(58) Field of Classification Search
CPC .... G06F 3/0689; G06F 3/0613; G06F 3/0631; G06F 3/0659; G06F 3/067
See application file for complete search history.

(56) References Cited

U.S. PATENT DOCUMENTS

| | | | |
|---|---|---|---|
| 10,642,501 B1* | 5/2020 | Patel | G06F 3/064 |
| 2018/0335975 A1* | 11/2018 | Cosby | G06F 3/0688 |
| 2019/0278482 A1* | 9/2019 | Dubeyko | G06F 3/0659 |
| 2020/0341663 A1* | 10/2020 | Gao | G06F 3/0619 |
| 2021/0005330 A1* | 1/2021 | Patil | H04L 67/12 |
| 2022/0138039 A1* | 5/2022 | Chawla | G06F 9/542 |
| | | | 714/4.3 |

* cited by examiner

*Primary Examiner* — Craig S Goldschmidt
(74) *Attorney, Agent, or Firm* — Sheridan Ross P.C.

(57) ABSTRACT

Methods and systems provided herein involve extracting an input/output (I/O) operation from a packet received over an I/O pipeline, the I/O operation comprising either a read request to read data from at least one storage device or a write request to write data to the at least one storage device; determining that an address associated with the I/O operation exists in a lookup table that is provided for thin provisioning of the at least one storage device; performing one or more RAID calculations associated with the at least one storage device based on the address and the I/O operation; and accessing the at least one storage device to perform the I/O operation based on the one or more RAID calculations; and second processing component configured to carry out a second set of operations that occur when the address associated with the I/O operation does not exist in the lookup table.

17 Claims, 8 Drawing Sheets

METHODS AND SYSTEMS FOR INTER-STACK COMMUNICATION FOR LOGICAL VOLUME MANAGEMENT

FIELD

Embodiments of the present disclosure relate generally to logical volume management and specifically to handling input/output operations in a logical volume management system.

BACKGROUND

Offering network storage space to client devices such as personal computers involves allocating a physical volume of a particular size. A user may request a network storage space of a particular size such as 100 GB. In response, the requested amount of data, e.g., 100 GB, is allocated to the user using a physical drive accessible over a network connection.

Using such a system causes an issue in which a user rarely or never needs the exact amount of requested storage space. For example, a user with 75 GB of photos may choose a 100 GB drive and never use 25 GB of the allocated storage causing a waste of potentially useful storage space.

BRIEF SUMMARY

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only and is not intended to limit the scope or applicability of the disclosure. Furthermore, to avoid unnecessarily obscuring the present disclosure, the preceding description omits a number of known structures and devices. This omission is not to be construed as a limitation of the scope of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

It is with respect to the above issues and other problems that the embodiments presented herein were contemplated. The present disclosure provides a thin provisioning solution in which a virtual drive is presented to a user but only the storage space used by the user is actually allocated.

For example, if a user seeks a 100 GB virtual drive because he or she has a 75 GB photo collection, as the user uploads the photos, or other data, to the virtual drive, storage space on physical drives is allocated on an as-needed basis. After the user uploads the 75 GB of photos, 75 GB of a physical drive is allocated for the user. The user may see that he or she still has 25 GB of storage remaining, but in reality, no actual 25 GB of a physical drive has been allocated to the user.

In an illustrative embodiment, a device includes: a central processing unit (CPU), an array of storage devices coupled to the CPU, and a device configured to handle input/output (I/O) operations on behalf of the CPU, the I/O operations including read requests to read data from the array of storage devices and write requests to write data to the array of storage devices, wherein the device includes: a first processing component configured to carry out a first set of operations that includes: extracting an I/O operation from a packet received over an I/O pipeline; determining that an address associated with the I/O operation exists in a lookup table that is provided for thin provisioning of the array of storage devices; performing one or more RAID calculations associated with the array of storage devices based on the address and the I/O operation; and accessing the array of storage devices to perform the I/O operation based on the one or more RAID calculations; and a second processing component configured to carry out a second set of operations that occur when the address associated with the I/O operation does not exist in the lookup table.

Additional features and advantages are described herein and will be apparent from the following Description and the figures.

BRIEF DESCRIPTION OF THE DRAWINGS

The present disclosure is described in conjunction with the appended figures, which are not necessarily drawn to scale.

DETAILED DESCRIPTION

Figure 1A:
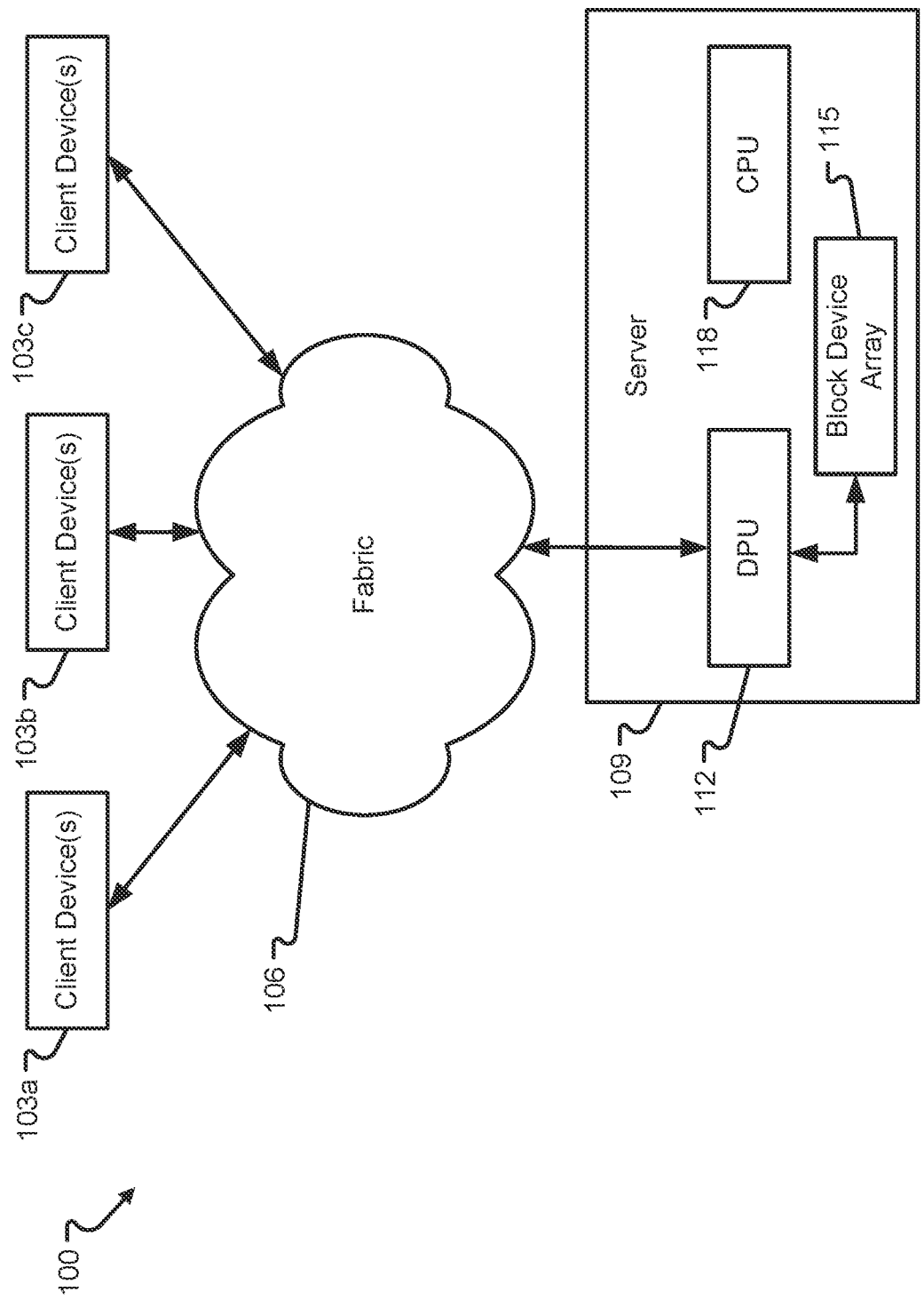
FIG. 1A is a block diagram of a computing environment in accordance with at least some embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a PCB, or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The terms "determine," "calculate," and "compute," and variations thereof, as used herein, are used interchangeably and include any appropriate type of methodology, process, operation, or technique.

Various aspects of the present disclosure will be described herein with reference to drawings that may be schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "include," "including," "includes," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Referring now to FIG. 1A, a computing environment 100 may comprise one or more client devices 103a-c which communicate with a server 109 over a fabric 106 in accordance with at least some embodiments of the present disclosure. The server 109 may comprise a CPU 118, a DPU 112, and a block device array 115 such as a RAID.

In some embodiments, the environment 100 illustrated in FIG. 1A may comprise a fabric 106 connecting one or more client devices 103a-c with a server 109. The fabric 106 may be, for example, a part of a local or distributed network. In accordance with at least some embodiments of the present disclosure, the fabric 106 may comprise any type of known communication medium or collection of communication media and may use any type of protocols to transport messages between endpoints. The fabric 106 may include wired and/or wireless communication technologies. The Internet is an example of a network that constitutes an Internet Protocol ("IP") network consisting of many computers, computing networks, and other communication devices located all over the world, which are connected through many telephone systems and other means. Other examples of the fabric 106 include, without limitation, an Integrated Services Digital Network ("ISDN"), a Local Area Network ("LAN"), a Wide Area Network ("WAN"), a VoIP network, a SIP network, a cellular network, and any other type of packet-switched or circuit-switched network known in the art. In addition, it should be appreciated that the fabric 106 need not be limited to any one network type, and instead may be comprised of a number of different networks and/or network types. The fabric 106 may comprise a number of different communication media such as coaxial cable, copper cable/wire, fiber-optic cable, antennas for transmitting/receiving wireless messages, and combinations thereof.

It is an aspect of the present disclosure that users of the client devices 103a-c may utilize the client devices 103a-c to interact with the server 109 and the block device array 115. The client devices 103a-c may transmit input/output (I/O) instructions in the form of packets to the server 109. The I/O instructions may comprise, for example, read and/or write commands instructing the server to read data from addresses in the block device array 115 and/or write data to addresses in the block device array 115.

In some embodiments, at least one of the client devices 103a-c may correspond to a computing device, a personal communication device, a portable communication device, a laptop, a smartphone, a tablet, a personal computer, and/or any other communication device capable of running an operating system ("OS"), at least one voice application, communication instructions, and/or the like. The communication devices or computer systems may be configured to operate various versions of Microsoft Corp.'s Windows® and/or Apple Corp.'s Macintosh® operating systems, any of a variety of commercially available UNIX® such as LINUX or other UNIX-like operating systems, iOS, Android®, etc. These communication devices or computer systems may also have any of a variety of applications, including for example, voice applications, chat applications, calling applications, email applications, SIP applications, etc., and/or combinations thereof. Additionally, or alternatively, the communication devices or computer systems, in some embodiments, may be any other electronic device, such as an Internet-enabled mobile telephone and/or a personal digital assistant, capable of communicating via the fabric 106.

In some embodiments, communications may be sent and/or received via a respective communication device or computer system as a packet or collection of packets (e.g., IP packets transmitted over an IP network).

As illustrated in FIG. 1A, the server 109 may include hardware and/or software resources that, among other things, provides the ability for receiving I/O instructions and other data from client devices 103a-c via the fabric 106. Among other things, the server 109 may provide functionality enabling the client devices 103a-c and/or other computer systems to store data and read data stored in memory or a data storage solution such as a block device array 115. The server 109 may comprise a network interface, a central processing unit 118, a data processing unit 112, a block device array 115, and/or other computing elements.

In some embodiments, the CPU 118 of the server 109 may correspond to one or more computer processing devices. For example, the CPU 118 may be provided as silicon, an Application-Specific Integrated Circuit ("ASIC"), as a Field Programmable Gate Array ("FPGA"), any other type of Integrated Circuit ("IC") chip, a collection of IC chips, and/or the like. In some embodiments, the CPU 118 may be provided as a microprocessor or a plurality of microprocessors that are configured to execute the instructions sets stored in memory.

A network interface of the server 109 may provide the server 109 with the ability to send and receive communication packets or the like over the fabric 106. The network interface may be provided as a network interface card ("NIC"), a network port, a modem, drivers for the same, and the like, or as part of a data processing unit ("DPU") 112 as discussed below. Communications between the components of the server 109 and other devices connected to the fabric 106 may flow through the network interface of the server 109. In some embodiments, examples of a suitable network interface include, without limitation, an antenna, a driver circuit, an Ethernet port, a modulator/demodulator, an NIC, an RJ-11 port, an RJ-45 port, an RS-232 port, a USB port, a DPU, etc. The network interface may include one or multiple different network interfaces depending upon whether the server 109 is connected to a single communication network or multiple different types of communication networks. For instance, the server 109 may be provided with both a wired network interface and a wireless network interface without departing from the scope of the present disclosure. In some embodiments, the network interface may include different communications ports that interconnect with various input/output lines.

The network interface may comprise hardware that facilitates communications with other devices (e.g., communication devices, computer systems, and/or servers, etc.) over the fabric 106. In some embodiments, the network interface may include an Ethernet port, a Wireless Fidelity ("Wi-Fi") card, a NIC, a cellular interface (e.g., antenna, filters, and associated circuitry), a DPU, or the like. The network interface may be configured to facilitate a connection between a client device 103a-c and the server 109.

The network interface may be a part of, comprised by, or associated with a data processing unit ("DPU") 112. The DPU 112 may be a system-on-a-chip comprising processing circuitry (e.g., one or more ARM-based cores, one or more x86-based cores), a network interface such as discussed above, and one or more acceleration engines.

The DPU 112 may be configured to enable client devices to utilize NVMe over Fabrics ("NVMeOF"), data encryption, elastic storage, data integrity, decompression, and deduplication when interacting with the server 109. The DPU 112 may serve as a data center services accelerator capable of delivering broadband Ethernet and InfiniBand connectivity while freeing the CPU 118 of the server 109 to run applications as opposed to infrastructure tasks. Stated another way, the CPU 118 may offload certain tasks to the DPU 112 to increase efficiency of the system.

The DPU 112 may comprise a number of ports such as Ethernet and/or InfiniBand ports capable of communicating over the fabric 106. In addition to the network interface, the DPU may comprise on-board memory such as RAM and/or data storage.

Upon executing instruction sets stored in memory, the DPU 112 enables various communications, compliance (e.g., authentication, checking, verification, and/or authorization, etc.), and/or interaction functions of the server 109, and may provide an ability to establish and maintain communication sessions between client devices (e.g., client devices 103a-c) and/or other computer systems over the fabric 106 when specific predefined conditions are met. The DPU 112 may comprise a processor corresponding to one or many computer processing devices. Non-limiting examples of a processor include a microprocessor, an IC chip, a General Processing Unit ("GPU"), a CPU, an ASIC, FPGA, any suitable type of Integrated Circuit ("IC") chip, a collection of IC chips, and/or the like. In some embodiments, the DPU 112 may be provided as a microprocessor or a plurality of microprocessors that are configured to execute the instructions sets stored in memory. The processor of the DPU 112 may comprise one or more processing cores (e.g., ARM-based and/or x86-based) and may perform computational functions using any known or future-developed standard, instruction set, libraries, and/or architecture. The processor of the DPU 112 may be a multipurpose, programmable device that accepts digital data as input, processes the digital data according to instructions stored in its internal memory, and provides results as output. The processor of the DPU 112 may implement sequential digital logic as it has internal memory.

The DPU 112 may also comprise memory which may correspond to any type of non-transitory computer-readable medium. In some embodiments, memory of the DPU 112 may comprise volatile or non-volatile memory and a controller for the same. Non-limiting examples of memory that may be utilized in the DPU 112 may include RAM, ROM, buffer memory, flash memory, solid-state memory, and/or variants thereof. Any of these memory types may be considered non-transitory computer memory devices even though the data stored thereby can be changed one or more times. In some embodiments, the memory may be configured to store rules and/or the instruction sets depicted in addition to temporarily storing data for the processor of the DPU 112 to execute various types of routines or functions.

Memory of the DPU 112 may include instructions that enable the DPU 112 to store data into a block device array 115, such as a memory storage device, and retrieve information from the block device array 115 as described herein. In some embodiments, the block device array 115 or the data stored therein may be stored internal to the communication server 109 (e.g., data stored within one or more hard or solid-state drives of the server 109 rather than in a separate database) or in a separate server.

A block device array 116 as described herein may comprise one or more data storage devices connected to the fabric 106 via the DPU 112. In some embodiments, the block device array 116 may comprise one or more redundant arrays of independent disks (RAID), though it should be understood that any other format of data storage may be utilized. It should be appreciated, the block device array 116 may comprise any number of discs, disk storage capacity, array storage capacity, RAID level, etc.

In some embodiments, the DPU 112 may be programmable such that a user may be enabled to interact with the DPU 112 to provide instructions. In such an embodiment, the server 109 may comprise one or more input, output, and/or display devices. In some embodiments, the server 109 may comprise at least one display device that renders information, applications, windows, interactive elements, and/or other visual output via a user interface. The server 109 may further include at least one display controller that controls an operation of the display device. This operation may include the control of input (e.g., input provided by a user via the user interface, command input via instruction sets in memory, and/or combinations thereof, etc.), output (e.g., display, rendered images, window behavior, etc.) and/or other functions of the display controller and display device.

A display device may comprise at least one display screen that selectively activates pixels and/or display elements to render one or more applications, windows, controls, interactive elements, icons, characters, images, etc. Examples of the display screen may include, but are in no way limited to, a Liquid Crystal Display ("LCD"), a Light Emitting Diode ("LED") display, an Electroluminescent Display ("ELD"), an Organic LED ("OLED") display, and/or some other type of display. In some embodiments, the display device may be configured to render information in one or more discrete areas (e.g., backgrounds, portions, windows, zones, etc.) of the display screen or superimposed in an area of the display screen.

A user interface may correspond to any type of input and/or output device, or combination thereof, that enables a user to interact with the server 109. As can be appreciated, the nature of the user interface may depend upon the nature of the server. Examples of the user interface may include, but are in no way limited to, user interface hardware and devices such as at least one touch-sensitive display elements, buttons, switches, keyboards, peripheral interface devices (e.g., mice, controller, etc.) as described herein. It is an aspect of the present disclosure that one or more devices in the user interface may provide an input that is interpreted by the CPU 118 and/or the DPU 112 in controlling one or more components of the server 109.

Figure 1B:
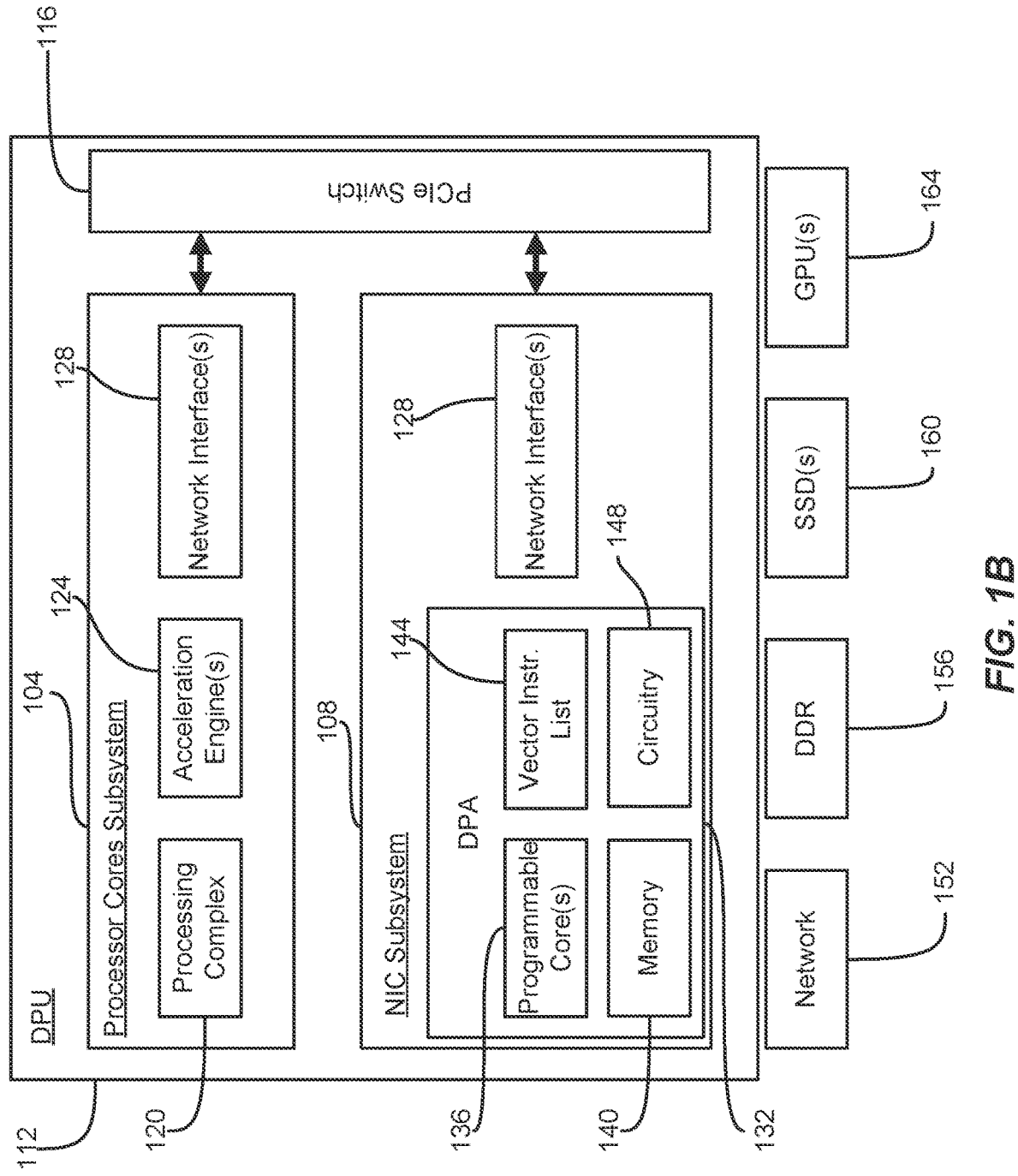
FIG. 1B is a block diagram of a data processing unit in accordance with at least some embodiments of the present disclosure.

Referring now to FIG. 1B, a specific, non-limiting example, of a DPU 112 will be described. The DPU 112 is shown to provide processing capabilities that include a Network Interface Controller ("NIC") subsystem 108 and a processor cores subsystem 104. The NIC subsystem 108 and processor cores subsystem 104 are shown to be connectable through a PCIe switch 116. While the DPU 112 is shown to include a NIC subsystem 108 and processor cores subsystem 104, it should be appreciated that the DPU 112 can provide other processor functions or types including, without limitation, CPU processors, GPU processors, and/or any other suitable type of processing architecture.

The processor cores subsystem 104 may be configured to provide general processing capabilities and may include a processing complex 120, one or more acceleration engines 124, and one or more network interfaces 128. The processing complex 120 may include one or multiple processing cores (e.g., Advanced RISC Machine ("ARM") processing cores, RISCV cores, CPU cores, GPU cores, etc.). As will be discussed in further detail herein, one or more processing cores of the processing complex 120 may include programmable cores 136 and/or circuitry 148 as shown in the NIC subsystem 108; however, such components are not shown for ease of reference and discussion.

The acceleration engine(s) 124 may provide hardware acceleration capabilities for the processors in the processing complex 120 and/or for external GPU(s) 164. As an example, a processing core in the processing complex 120 may use one or more acceleration engines 124 to perform a specific function whereas other undefined functions may be performed within the processing core of the processing complex 120. The acceleration engine(s) 124 can be appropriately configured to perform specified functions more quickly, with fewer computations, etc. as compared to other components of the processing complex 120.

The network interface(s) 128 may provide connectivity between components of the processor cores subsystem 104 and other components external to the processor cores subsystem 104. Illustratively, the network interface(s) 128 may provide connectivity to the PCIe switch 116 and/or one or more other external elements, such as an external network 152, a DDR 156, an SSD 160, and/or a GPU 164.

The network interface(s) 128 may include physical, mechanical, optical, and/or electrical components that allow a remote device to communicate with the processing complex 120 and/or acceleration engine(s) 124 of the processor cores subsystem 104. The network interface(s) 128 may enable physical connections to a cable, wire, fiberoptic, etc. Alternatively or additionally, the network interface(s) 128 may facilitate wireless communications, in which they may include one or more antennas, drivers, or the like.

The NIC subsystem 108 is illustrated as another element of the DPU 112. It should be appreciated that the components of the NIC subsystem 108 and components of the processor cores subsystem 104 may be in communication with one another via the PCIe switch 116 or by some other communication mechanism. The NIC subsystem 108 and processor cores subsystem 104 may be provided on a common substrate, motherboard, or silicon. Alternatively, the NIC subsystem 108 and processor cores subsystem 104 may be provided on totally separate substrates, motherboards, or silicon.

As a non-limiting example, the NIC subsystem 108 may provide functionality similar to a network adapter or other type of networking device. Illustrated components provided in the NIC subsystem 108 include, without limitation, a Data Processing Accelerator (or Data Path Accelerator) (DPA) 132 and one or more network interfaces 128. The DPA 132 may include one or more programmable cores 136, memory 140, a vector instruction list 144, and circuitry 148. The circuitry 148 may include or be similar to circuitry 3700. While illustrated as separate components, it should be appreciated that certain components of the DPA 132 may be combined with one another. For instance, the vector instruction list 144 and/or circuitry 148 may be included in the one or more programmable cores 136. Alternatively or additionally, the memory 140 may be provided external to the DAP 132 or may be integrated as part of the programmable core(s) 136.

The programmable core(s) 136 may include one or more hardware and/or software components that are programmable and may support one or more functions of the DPU 112. Examples of a suitable programmable core 136 include, without limitation, a programmable logic core ("PLC"), a programmable logic array ("PLA"), etc. The programmable core(s) 136 may be implemented in hardware and/or software on any type of medium. For instance, the programmable core(s) 136 may be provided as a programmable SoC, a programmable ASIC, a programmable digital circuit, combinations thereof, or the like. The programmable core(s) 136 may be similar or identical to other cores described herein, such as processing cores that were described as being included in the processing complex 120. In some embodiments, the programmable core(s) 136 and/or circuitry 148 may be configured to perform matrix multiplication functions.

The memory 140 may correspond to any suitable type of memory device or collection of memory devices already described herein. Non-limiting examples of devices that may be provided as memory 140 include RAM, ROM, flash memory, buffer memory, combinations thereof, and the like. In some embodiments, the memory 140 may be cache line aligned.

The vector instruction list 144 may include one or more instructions (e.g., vector instructions) that are capable of being performed in the programmable core(s) 136 and/or circuitry 148. In some embodiments, the vector instruction list 144 may provide a listing of functions that can be performed by the circuitry 148 or by other components (e.g., programmable core(s) 136, the GPU(s) 132, etc.). In some embodiments, functions (e.g., vector functions) that may be supported by the DPU 112 and, thereby, made available in the vector instruction list 144 include, without limitation, non-linear functions, linear functions, a hyperbolic tangent function (tanh(x)) function, a sigmoid function, a Rectified Linear Activation (ReLU) function, a softmax function, a softsign function, and an Exponential Linear Unit (ELU) function. Other suitable functions (whether activation functions or not) may also be listed in the vector instruction list. Non-limiting examples of such functions other than an activation function include a matrix multiplication function, a multiply add function, a vector accumulate function, a vector add function, a vector multiply function, a vector load function, and a vector store function. One or more of the instructions provided in the vector instruction list 144 may be carried out completely in hardware (e.g., using the circuitry 148) and/or may utilize buffer(s) and/or a lookup table as will be described herein. In some embodiments, the circuitry 148 may be configured to compute matrix multiplication operations.

The network interface 128 may be similar or identical to the network interface 128 included in the processor cores subsystem 104 and may include hardware and/or software components that enable operations of the NIC subsystem 108 at the network layer. The network interface 128 may also facilitate connectivity to the PCIe switch 116. Examples of protocols that may be supported by the network interface 128 include, without limitation, Ethernet, WiFi, Fibre Channel, Asynchronous Transfer Mode ("ATM"), Fiber Distributed Data Interface ("FDDI"), RDMA/TCP/UDP, ASAP2, InfiniBand, etc.

The PCIe switch 116 may include hardware and/or software that includes an expansion bus for a PCIe hierarchy on the DPU 112. In some embodiments, the PCIe switch 116 may include switching logic that routes packets between one or more ports of the PCIe switch 116. The PCIe switch 116 may include two or more different ports that are included as or that are connected to the network interface(s) 128 of the NIC subsystem 108 and processor cores subsystem 104.

Figure 2A:
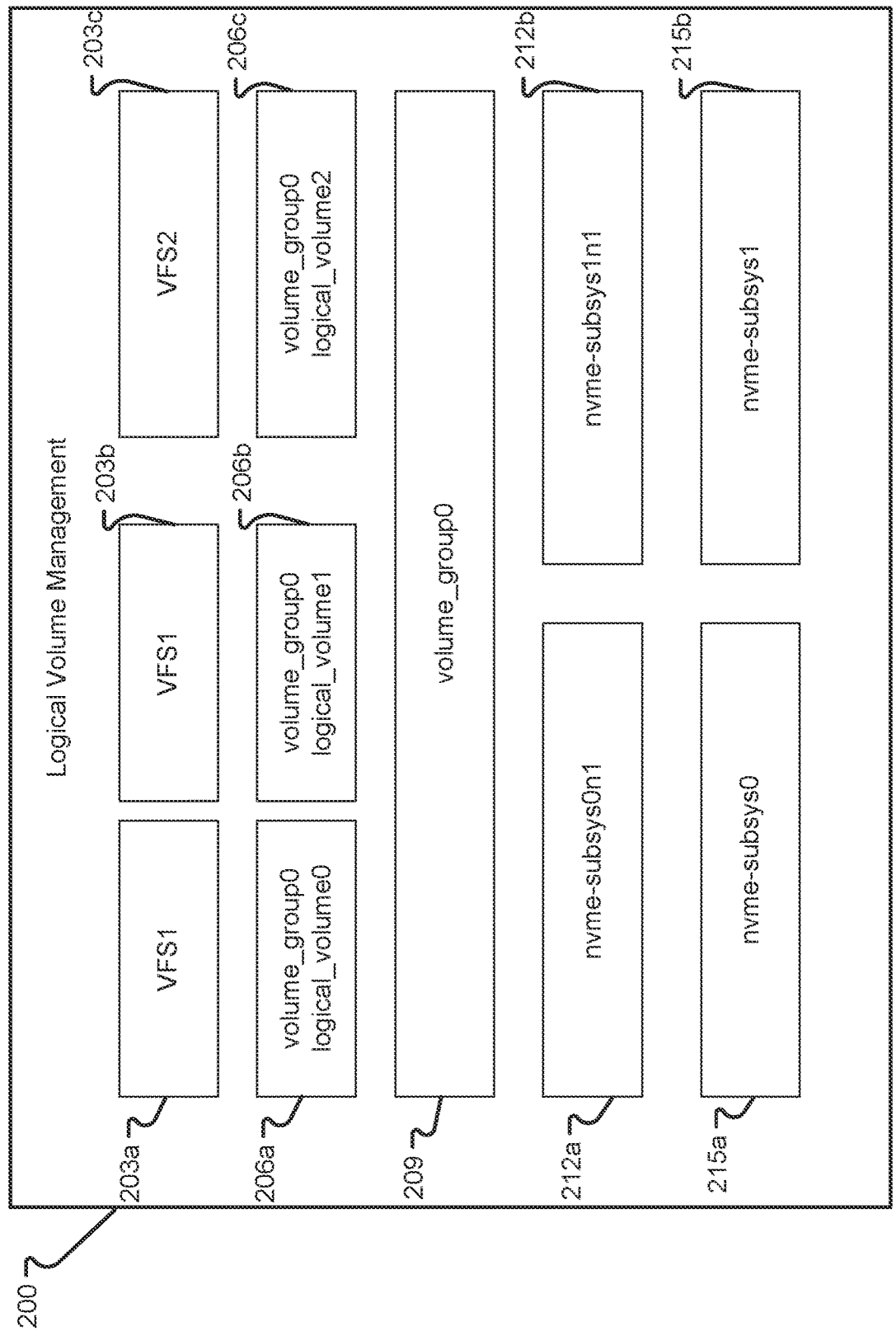
FIG. 2A is a block diagram depicting components of a logical volume management system in a computing environment in accordance with at least some embodiments of the present disclosure.

In some embodiments, the DPU 112 may be configured to manage or operate one a storage device with a logical volume management ("LVM") system 200 as illustrated in FIG. 2A. As described herein, an LVM system 200 may comprise a multi-layer architecture comprising virtual file systems ("VFSs") 203a-c, logical volumes 206a-c, one or more volume groups 209, physical volumes 212a, 212b, and physical drives 215a, 215b, as illustrated in FIG. 2A.

In some embodiments, physical volumes 212a, 212b, may correspond to physical drives 215a, 215b. For example, a solid-state drive (SSD) utilizing a non-volatile memory express (NVMe) system may be associated with a physical volume. A physical drive, such as an NVMe system may be divided into a plurality of physical volumes.

An LVM may comprise a plurality of physical drives 215a, 215b, and physical volumes 212a, 212b. Physical volumes 212a, 212b may be logically organized as one or more volume groups 209. For example, an LVM may comprise one volume group 209 and one volume group 209 may comprise a plurality of physical volumes 212a, 212b.

A volume group 209 representing a plurality of physical volumes 212a, 212b across one or more physical drives 215a, 215b may be divided into a plurality of logical volumes 206a-c. Each logical volume 206a-c may be associated with one or more virtual file systems VFSs 203a-c. In some embodiments, one logical volume 206a-c may be associated with a plurality of VFSs 203a-c.

Figure 2B:
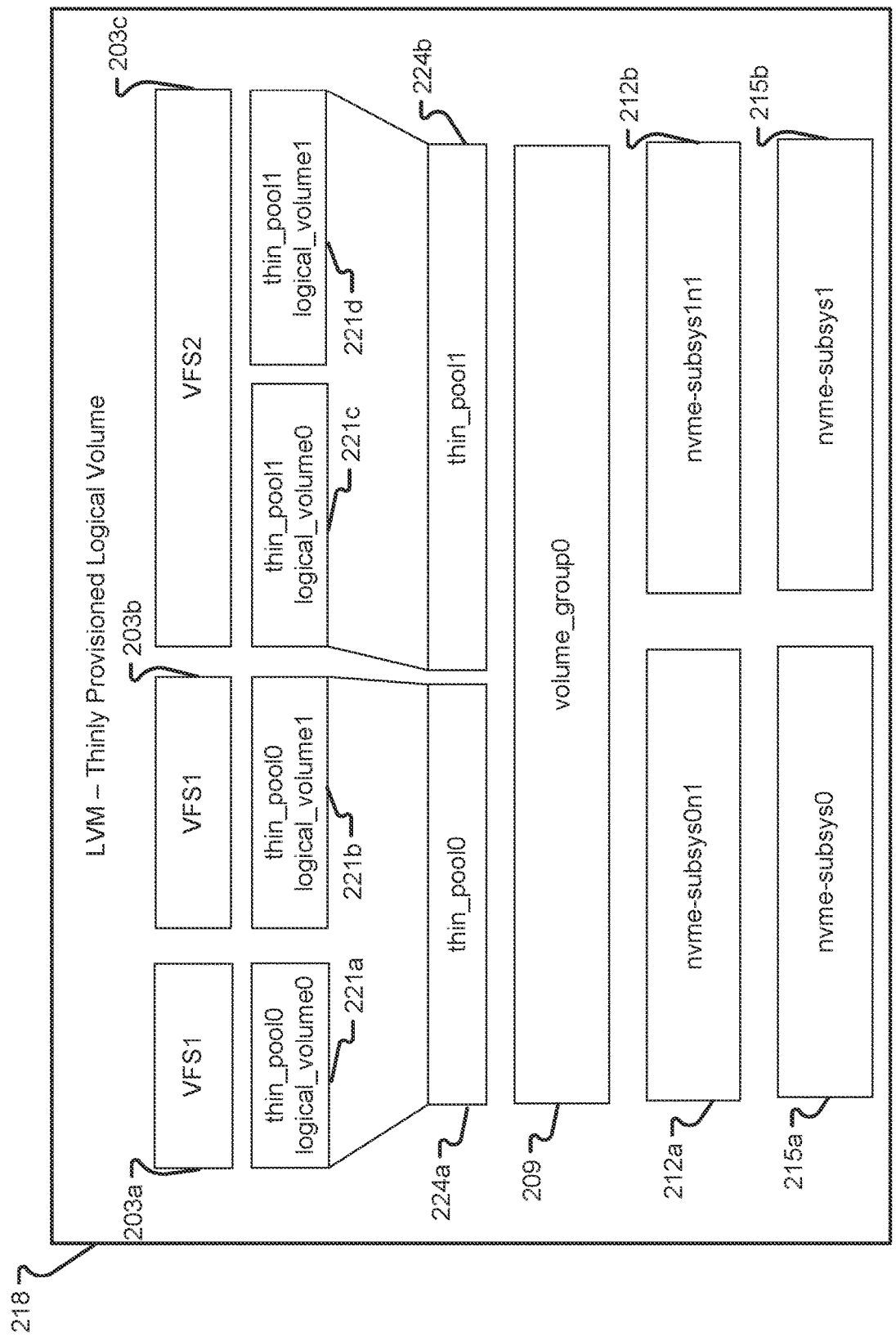
FIG. 2B is a block diagram depicting components of a logical volume management system for a thinly provisioned logical volume in a computing environment in accordance with at least some embodiments of the present disclosure.

As illustrated in FIG. 2B, an LVM system 218 may be thinly provisioned. Thin provisioning can be used to allocate disk space to users on demand based on how much space the users need at any given time. In an embodiment utilizing thin provisioning, a volume group 209 may be associated with one or more thin pools 224a, 224b and each thin pool 224a, 224b may be associated with one or more thinly provisioned logical volumes 221a-d. In some embodiments, one thin pool 224, 224b may be associated with a plurality of thinly provisioned logical volumes 221a-d. Each thinly provisioned logical volume 221a-d may be associated with one or more VFSs 203a-c.

As discussed in more detail below with reference to FIGS. 3A and 3B, thin provisioning may be implemented with a DPU such as the DPU 112 discussed above. A software stack in accordance with one or more of the embodiments described herein may comprise one or more of an NVMe over Fabrics (NVMeOF) API, a thin-provisioning (TP) API, a RAID API, and an NVMe block device layer (NVMe bdev) API.

An NVMeOF API may be configured to add and/or remove volumes from a storage system.

A TP API may be configured to map and/or unmap chunks of data from the storage system. A thinly provisioned logical volume may be a block device comprising one or more chunks allocated from a pool. When a write command is read a thinly provisioned logical volume, one or more chunks from a pool may be allocated. The TP API may be configured to map and/or unmapped chunks of data from the storage system. Using the TP API, a DPU may be enabled to, upon receiving a write command, map one or more chunks of data from a storage system based on the command.

A RAID API may be configured, when executed by a DPU, to set a RAID set, query a RAID, or perform other RAID-associated tasks. A RAID system, as used herein, may be a computer storage system of one or more of the standard RAID levels. A RAID system may employ striping, mirroring, and/or parity to create a large reliable data store from one or more disks. For example, RAID as used herein may refer to one or more of RAID 10 (also called RAID 1+0), RAID 0, RAID 1, RAID 2, RAID 3, RAID 4, RAID 5, and RAID 6.

An NVMe bdev API may be configured, when executed by a DPU, to provide a number of features such as providing a common abstraction for a plurality of block devices.

Figure 3A:
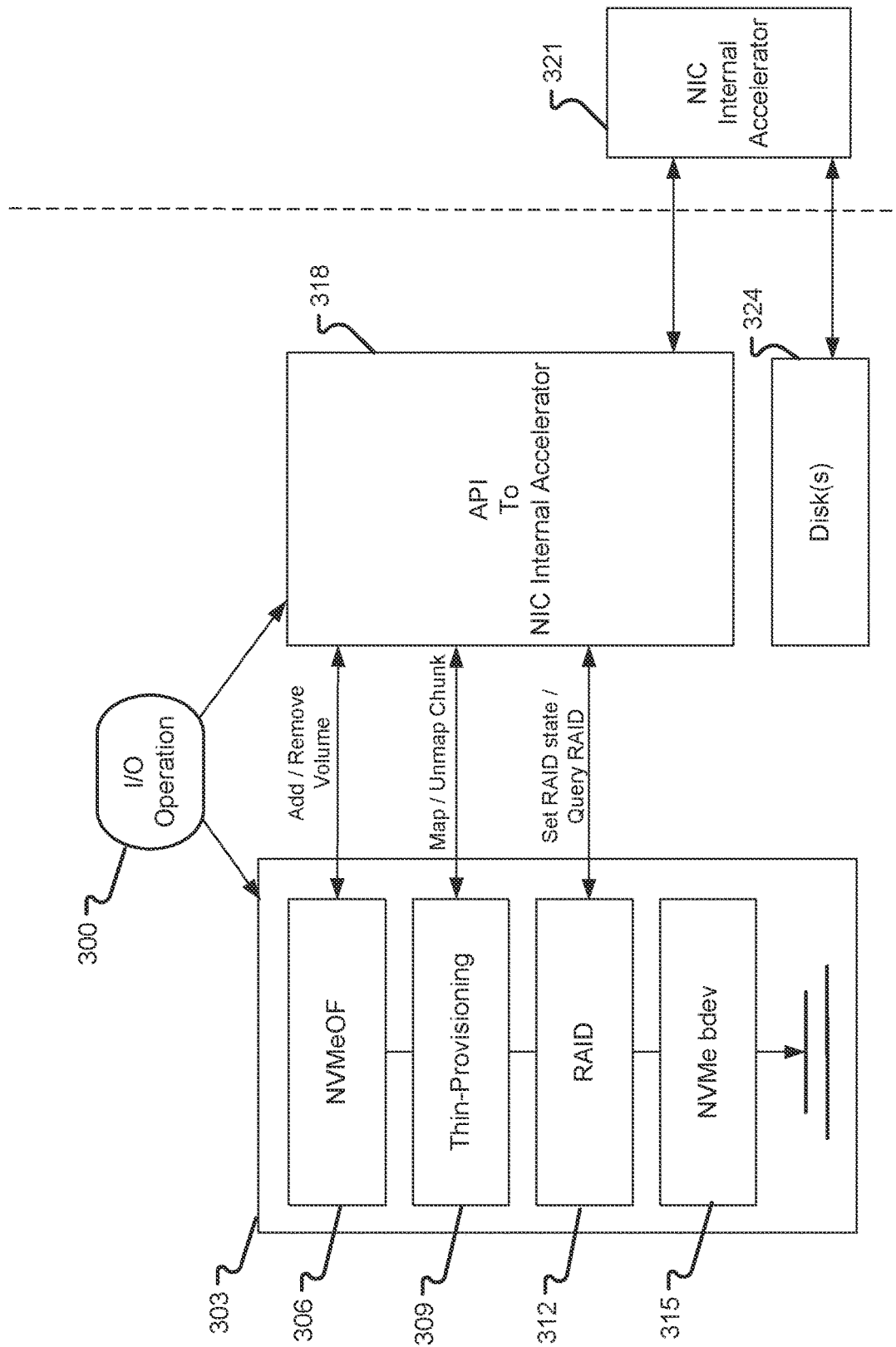
FIG. 3A is a block diagram depicting a device handling an input/output operation in accordance with embodiments of the present disclosure.

As illustrated in FIG. 3A, an inter-stack communication system may comprise a DPU software stack 303 comprising one or more APIs as described above. Such APIs may comprise, for example, an NVMeOF API 306, a TP API 309, a RAID API 312, an NVMe bdev API 315, and/or other APIs which may be used in conjunction with an LVM system.

The APIs may communicate with a NIC internal accelerator 321 via an API to NIC Internal Accelerator system 318. The NIC internal accelerator 321 may be configured to access one or more disks 324. In this way, only the NIC internal accelerator 321 accesses the disk(s) 324 (i.e., disks 324 are isolated from the APIs illustrated in FIG. 3A).

Upon receiving an I/O operation 300 such as from a client device over a fabric, a DPU (e.g., DPU 112) may be configured to process the I/O operation 300 using both the software stack 303 and the API to NIC internal accelerator 318. The software stack 303 and the NIC internal accelerator 318 may correspond to at least parts of the processing components described herein.

Figure 3B:
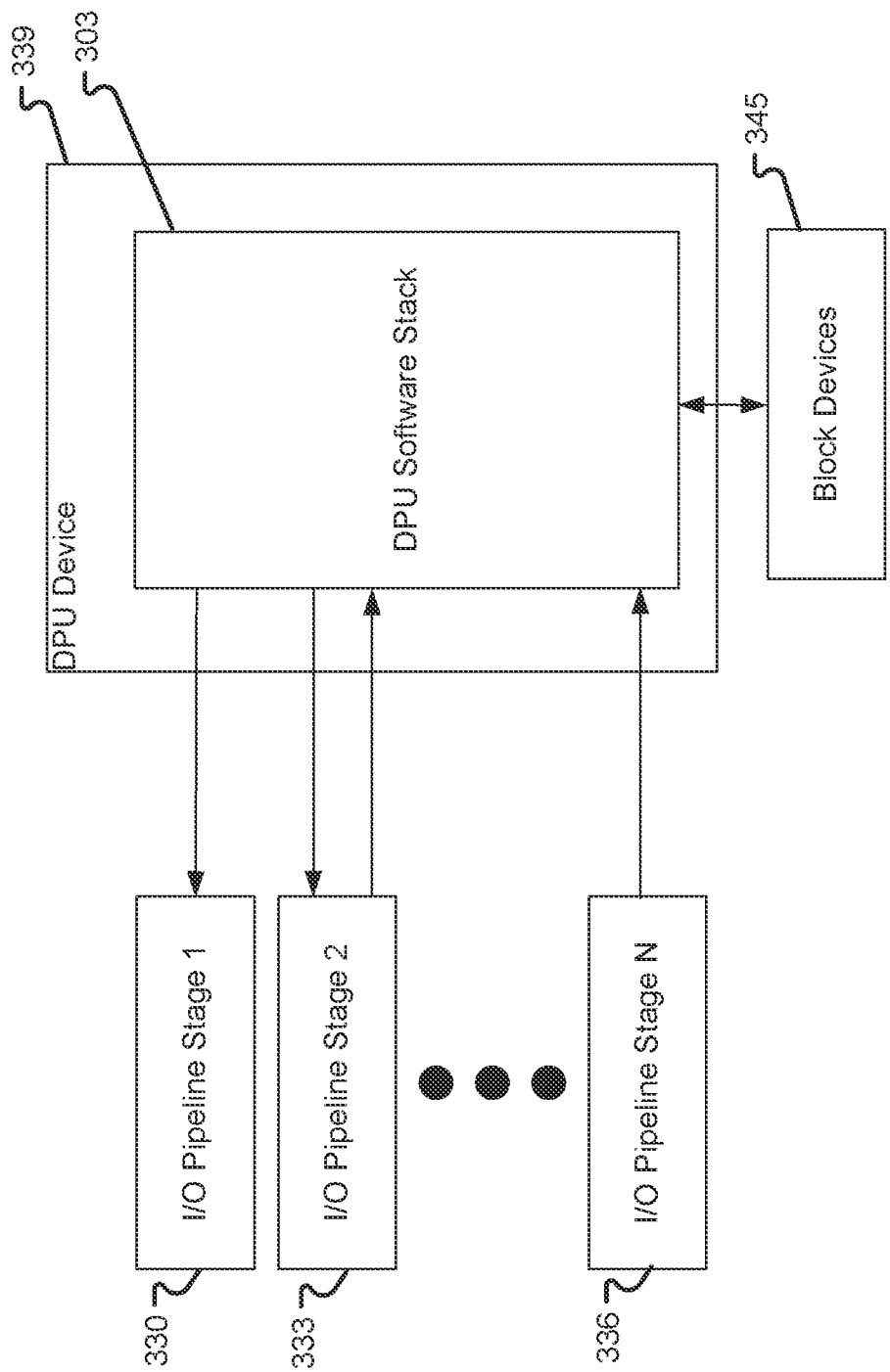
FIG. 3B is a block diagram depicting a device comprising an input/output pipeline in accordance with embodiments of the present disclosure.

As illustrated in FIG. 3B, one or more input/output ("I/O") pipelines or pipeline stages 330, 333, 336, may be used to interact with a DPU software stack 303 (the same software stack as in FIG. 3A) to perform operations associated with each pipeline. The pipelines 330 to 336 may be part of the fabric 106 that connects a DPU 112 to client devices 103a-c. Using an I/O pipeline system, the DPU device 339, which may correspond to DPU 112, may process received I/O operations in a parallel manner.

It should be appreciated that some layers or stages 330, 336 of the I/O pipeline may utilize one-way communication such as for RAID, while other layers or stages 333 may utilize two-way communication.

As illustrated, types of I/O pipelines include a pipeline for NVMeOF I/O operations, a pipeline for thin provisioning I/O operations, a pipeline for RAID I/O operations, and a pipeline for NVMe bdev I/O operations. A DPU software stack 303 may comprise a separate software component for each type of I/O pipeline and each separate software component may comprise an API (e.g., 306, 309, 312, 315) that performs certain operations when the accelerator 321 encounters an error or other issue not resolvable by the accelerator 321 itself.

Figure 4:
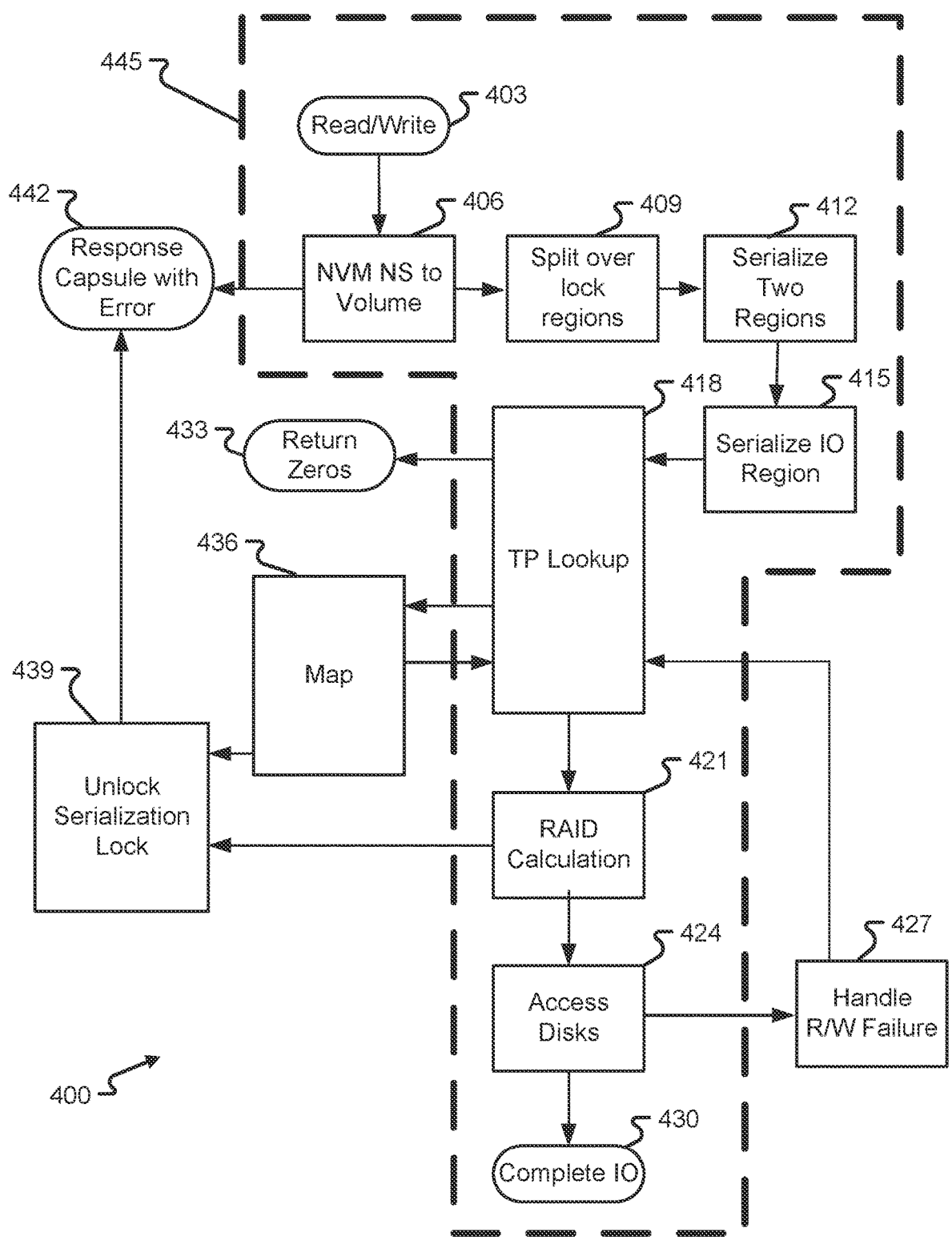
FIG. 4 is a flowchart of a method in accordance with one or more embodiments of the present disclosure.

A DPU configured as illustrated in FIGS. 1A, 1B, 3A and/or 3B may perform a method of handling I/O operations as illustrated in FIG. 4.

FIG. 4 is a flow diagram depicting a method 400 of a method of utilizing a DPU as described herein to offload processes relating to handling I/O operations received over a fabric from one or more client devices. The method 400 may be performed by a system comprising a central processing unit (CPU), at least one storage device or an array of storage devices coupled to the CPU, and a device such as a DPU configured to handle input/output (I/O) operations on behalf of the CPU, the I/O operations including read requests to read data from the array of storage devices and write requests to write data to the array of storage devices. The read and/or write requests may be performed for a system that employs thin provisioning.

At 403, a DPU receives a read or write (I/O) operation from a client device. An I/O operation may be a read or a write. For example, the DPU may be a DPU 112 of a server 109 including a block device array 115 as described above. Receiving an I/O operation may comprise receiving an I/O operation from an I/O pipeline as illustrated in FIGS. 3A and 3B (e.g., a pipeline 309 for thin-provisioning I/Os). In some embodiments, receiving an I/O operation may comprise extracting the I/O operation from a packet received over an I/O pipeline. The I/O operation may comprise either a read request to read data from at least one storage device of the block device array 115 or a write request to write data to the at least one storage device of the block device array 115.

At 406, upon receiving an I/O operation, the DPU may be configured to associate an NVM namespace (NS) associated with the received I/O operation with a volume in memory.

A namespace (NS) is a collection of logical block addresses (LBA) accessible to host software. In some embodiments, an I/O operation may comprise an identification of an NS. Upon receiving an I/O operation, a DPU of the server may identify a volume associated with an NS identified by the I/O operation. If the identified NS of the I/O operation is invalid, the DPU may respond to the I/O operation with a response capsule indicating an error has occurred. In some embodiments, the response capsule may include a description of the error, e.g., a statement or identifier indicating the NS identified by the I/O operation was invalid. Determining whether an NS identified by an I/O operation is valid may in some embodiments comprise performing a lookup in a flow table.

If the NS is valid, and a volume is identified, the DPU may next split the I/O operation over lock regions, if useful, at 409. For example, an I/O operation may indicate a particular address or addresses of memory to be written or read. Memory may be logically divided into one or more addressable regions. In some cases, an I/O operation may indicate addresses in two or more regions. If the I/O operation indicates addresses in two or more regions, the DPU may be configured to serialize all regions associated with the addresses indicated by the I/O operation. In this way, the memory to be read or written based on the I/O operation may be logically adjacent. In some embodiments, memory regions may be allocated in one or more pools.

Next, at 412, the DPU may serialize the I/O region associated with the I/O operation such that the commands with addresses to be read or written based on the I/O operation are serialized. It should be appreciated such a step may not be necessary in the event that an I/O operation is associated with only one region. At 415, the DPU may perform a serialization of a region associated with the I/O operation. In some embodiments, a thin-provisioning lock may be performed. For example, a block may be locked due to a TRIM command as SSDs may not be capable of writing over previously used addresses. TRIM may be used to erase blocks and old addresses may be filled with zeros. In some embodiments, a TRIM command may be received concurrently with a write command. In such a case, a thin provisioning lock may be used to serialize both commands. A disk lock may be used to serialize a write command in case of mirroring in two or more disks. For example, two writes to a particular address on two disks may be serialized at 415.

In some embodiments, a thin provisioning lock may comprise locking one or more thin provisioning metadata updates. A lock may be performed on a TP super chunk that comprises a set of smaller TP chunks. In the case of an allocated I/O, a TP lock may occur upon leaving the TP layer.

After serializing the I/O region, the DPU may perform a thin provisioning lookup at 418. Performing a thin provisioning lookup may in some embodiments comprise determining that an address associated with the I/O operation exists in a lookup table provided for dynamic storage allocation within a storage device.

Performing a thin provisioning lookup may in some embodiments comprise determining the address within the at least storage device with static address translation using the address associated with the I/O operation.

If I/O operation is a read operation and if the location to be read is unmapped, or the address associated with the I/O operation does not exist in the lookup table, the DPU may be configured to respond to the I/O operation with zeros at 433. Else, the method proceeds to 421.

If the I/O operation is a write operation and if the location to be written is unmapped, or the address associated with the I/O operation does not exist in the lookup table, the DPU may be configured to map the location at 436 and/or dynamically allocate an address to the I/O operation and add the dynamically allocated address to the lookup table when the I/O operation comprises the write request.

If the location to be mapped has insufficient or zero capacity, the DPU may unlock the serialization lock at 436 and return a response capsule with an error at 442.

It should be appreciated a thin-provisioning lock may be used before or after the TP lookup 418, disks may be locked prior to being accessed at 442, and disks may be unlocked prior to completing the input/output operation at 430.

After executing the TP lookup at 418, the DPU may next perform one or more RAID calculations associated with the at least one storage device based on the address and the I/O operation at 421. Performing the one or more RAID calculations based on a dynamically allocated address as described above. Performing a RAID calculation may comprise determining an address within at least one storage device based on the address associated with the I/O operation. Performing a RAID calculation may comprise in some embodiments determining whether an adequate number of disks exist.

After performing the RAID calculation, if there are no errors the method 400 may comprise generating an I/O command to either read data from or write data to the address within a storage device based on the received I/O command. The I/O command may be generated based on the one or more RAID calculations discussed above and at least one storage device may accessed to perform the I/O operation based on the one or more RAID calculations.

If there are no disks or an insufficient number of disks, the DPU maybe configured to unlock the serialization lock at 439 and return a response capsule indicating an error occurred in response to the I/O operation at 442.

If there is a sufficient number of disks, the DPU may be configured to lock the disks to be written or read, access the disks at 424, unlock the disks, and complete the I/O operation at 430.

In some embodiments, upon successful completion of an I/O operation, a response capsule may be returned indicating success. For example, an I/O response message may be constructed upon completion of the I/O operation and send the I/O response message to a client device that sent the packet.

It should be appreciated that if an error occurs, such as the DPU being unable to access the disks, a read/write (R/W) failure may occur. The DPU may be configured to handle the R/W failure at 427 and issue a retry. In response to a retry being issued, the method 400 may comprise returning to the step of performing a thin-provisioning lookup at 418 and as discussed above. If the R/W failure cannot be handled, an error return capsule may be returned.

An example of a R/W failure is in the case of a hot unplug. The software may query the disks, set the RAID state to degraded, submit the operation at the TP lookup stage, and then at the second pass through the RAID calculation, the no disks error may occur. A RAID pair of disks 0,1 may be in any one of a plurality of states. Such states may comprise, for example, NONE, NORMAL, DEGRADED 0, DEGRADED 1, REBUILD 0->1, REBUILD 1->0, and REBUILD ANY. A RAID state of NONE may indicate that no active disks are available and may prompt an immediate return error response capsule. A RAID state of NORMAL may indicate a write command should go to both disks of the RAID pair and prompt static read balancing. A RAID state of DEGRADED 0 or DEGRADED 1 may indicate all I/O should be executed with fast path using disk 0 or 1 only, respectively. A RAID state of REBUILD ANY may indicate a write command should go to both disks of the RAID pair, with each read from both disks and CRC (cyclic redundancy check) LBA metadata being compared and if a mismatch is detected, another copy operation may be performed.

The method 400 implemented by a DPU of a server may enable the DPU to perform tasks ordinarily performed by a CPU of the server, thus offloading duties and tasks from the CPU. In this way, host involvement, i.e., involving the CPU of the server, can be avoided for LVM tasks. Using a DPU as described herein, provides capabilities of performing computations and dynamic calculations on the data path and not in an application-specific integrated circuit ("ASIC"). In this way, the DPU may enable capabilities of performing dynamic computations and/or calculations which are not hardwired into any ASIC.

The functions performed by the DPU as described herein may be split over two processing components. A first component may be tasked with functions relating to lookup while a second component may use software to write information to the lookup table. For example, with reference to FIGS. 3A, 3B, and 4, a first processing component may correspond to hardware (e.g., part of the internal accelerator 321) or some other suitable part of the DPU 112 that performs a set of operations that includes 403, 406, 409, 412, 415, 418, 421, 424, and/or 430 in FIG. 4. Bounding box 445 illustrated in FIG. 4 encircles the operations which may be performed by the first processing component, e.g., part of the internal accelerator 321, while operations outside the box 445 may be performed by a second processing component (e.g., one or more APIs executed by the DPU).

In one example, the first processing component performs these operations on behalf of the CPU 118 without direct involvement of the CPU 118. When the first processing component encounters a roadblock or error in operations 406, 418, 421, and/or 424, a second processing component may take over. The second processing component of the DPU 112 may correspond one or more APIs in the stack 303 and/or the API to the NIC internal accelerator 318, or to some other part of the DPU 112 that handles errors on behalf of the first processing component to perform a set of operations that includes 427, 433, 436, 439, and/or 442 in FIG. 4. Stated another way, the second processing component handles tasks that the first processing component determines to be not possible for the first processing component to perform at operations 406, 418, 421, and/or 424.

In at least one embodiment, the first processing component and the second processing component may operate on different I/O requests simultaneously in that a first I/O request may be passed off by the first processing component to the second processing component at 418, 421, or 424 while the first processing component has already begun processing a second I/O request at 406.

Figure 5:
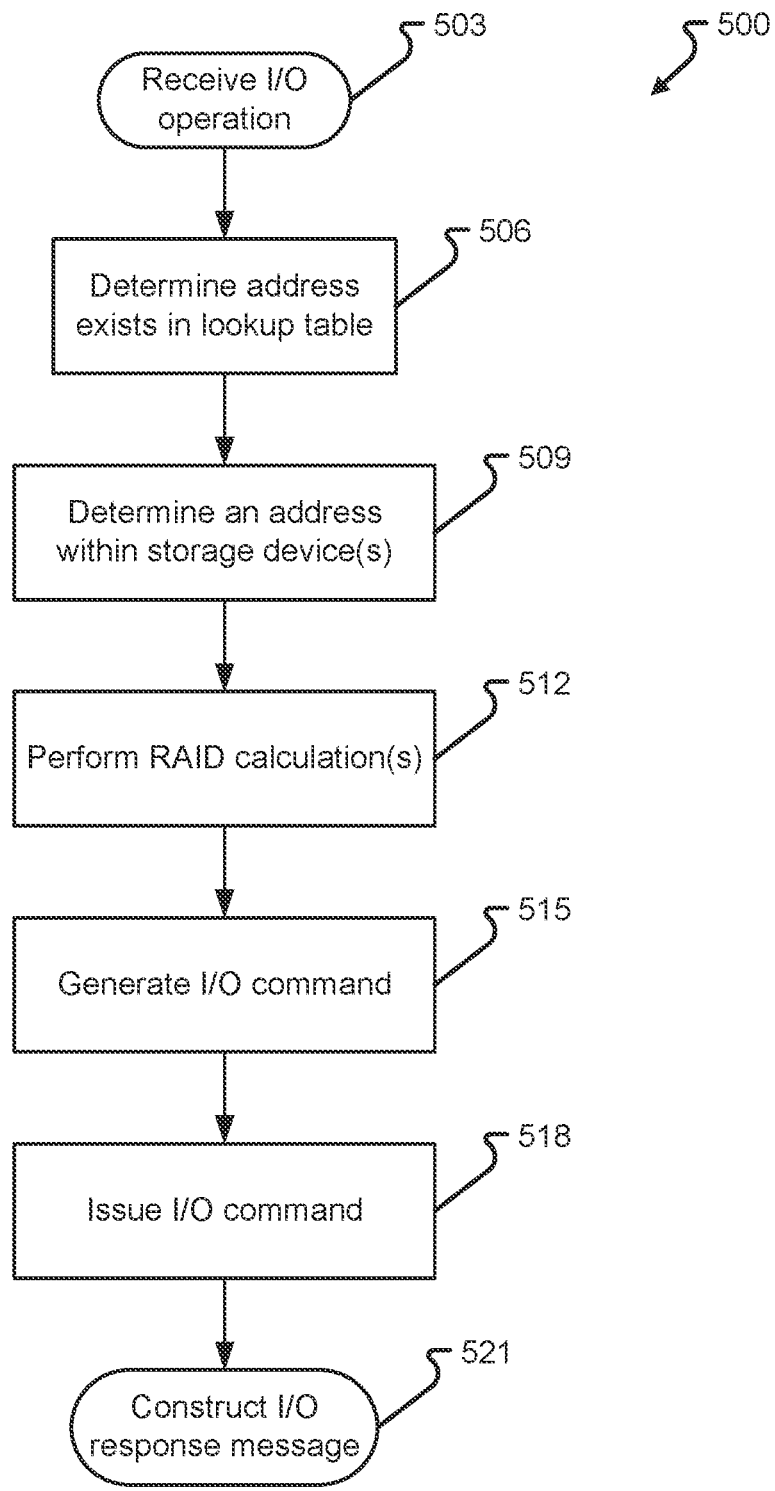
FIG. 5 is a flowchart of a method in accordance with one or more embodiments of the present disclosure.

As illustrated in FIG. 5, a device as described herein may be configured to perform a method 500 of generating an I/O command to either read data from or write data to an address within at least one storage device based on a received I/O operation. The device of FIG. 5 may comprise a DPU of a server as described with reference to FIGS. 1-4. The DPU may be configured to receive data and to read data from and write data to one or more storage devices and/or a block array as described herein.

For example, the device may be a part of a system comprising a CPU and one or more, or an array of, storage devices coupled to the CPU. The device may be configured to handle I/O operations on behalf of the CPU. The I/O operations may include, for example, read requests to read data from the storage device(s) and write requests to write data to the storage device(s).

The device may comprise first and second processing components as described herein. For example, a first processing component may correspond to the accelerator 321 while the second processing component may correspond to the software stack 303. Each processing component may be configured to perform one or more of the steps of the method 500. In some embodiments, a first processing component may comprise an accelerator 321 as described above. In some embodiments, a second processing component may correspond to one or more of the APIs described above such as the NVMeOF API 306, TP API 309, RAID API 312, NVMe bdev API 315, and/or other APIs which may be used in conjunction with an LVM system. The second processing component may be configured to respond in the event of errors or other issues which arise in the performance of steps of the methods as described herein. For example, if an error or other type of issue occurs during the performance of the method 400 described above in relation to FIG. 4 or the method 500 described below in relation to FIG. 5, the accelerator 321 or first processing component may be configured to consult an appropriate API or second processing component for resolution of the error or issue. For example, the first processing component comprising an accelerator 321 may prompt a second processing component comprising a TP API if the lookup fails at 418 or prompt a second processing component comprising a RAID API if the RAID calculation fails at 421.

The method 500 may begin when the device receives an I/O operation from an I/O pipeline at 503. The I/O operation may be received from a first processing component of the device. Receiving the I/O operation may comprise extracting the I/O operation from a packet received over the I/O pipeline. The I/O operation may comprise one or more of a read request to read data from the storage device(s) and a write request to write data to the storage device(s).

The I/O pipeline may be one or more of multiple possible types of I/O pipelines illustrated in FIGS. 3A and/or 3B. For example, the I/O pipeline may be one or more of a pipeline for NVMeOF I/O operations, a pipeline for thin provisioning I/O operations, a pipeline for RAID I/O operations, and a pipeline for NVMe bdev I/O operations. The first processing component may consult a separate software component for each type of I/O pipeline. Each separate software component may comprise an API (see FIG. 3A).

After receiving the I/O operation, the first processing component may next determine that an address associated with the I/O operation exists in a lookup table provided for dynamic storage allocation and/or for thin provisioning within the storage device(s) at 506 (see also 418). In some embodiments, a second processing component may be configured to carry out a set of operations which occur when the address associated with the I/O operation does not exist in the lookup table. Such operations may include one or more of returning zeroes when the I/O operation comprises a read request (see also 433) and, when the I/O operation comprises a write request, dynamically allocating an address to the I/O operation and adding the dynamically allocated address to the lookup table (see also 436). In some embodiments, the second processing component may also be configured to carry out a set of operations that occur when a mapping of a namespace of the I/O operation fails (see also 442).

After determining the address associated with the I/O operation exists in the lookup table, the first processing component may determine an address within the storage device(s) based on the address associated with the I/O operation at 509. In some embodiments, the processing component may be configured to determine the address within the storage device(s) through static address translation using the address associated with the I/O operation.

After determining the address within the storage device(s), the first processing component may perform one or more RAID calculations associated with the storage device(s) based on the address and the I/O operation at 512 (see also 421).

In some embodiments, the one or more RAID calculations may be performed based on an address dynamically allocated by the second processing component as discussed above. In some embodiments, the second processing component may be configured to carry out a set of operations that occur when the one or more RAID calculations indicate an error.

At 515, the first processing component may generate an I/O command to either read data from or write data to the address within the storage device(s) based on the I/O operation. In some embodiments, the I/O command may be based on the one or more RAID calculations discussed above.

At 518, the first processing component may issue the I/O command to the storage device(s) to carry out the I/O operation (see also 430). Issuing the I/O command may in some embodiments comprise the first processing component accessing the storage device(s) to perform the I/O operation based on the one or more RAID calculations. In some embodiments, the second processing component may be configured to carry out a set of operations that occur when the I/O operation fails upon the first processing component accessing the storage device(s) (see also 427).

At 521, the method 500 may end with the construction of an I/O response message upon completion of the I/O operation and the I/O response message may be sent to a client device that sent the packet.

With reference to FIGS. 1-5, two processing components of the DPU may comprise a first processing component configured to carry out a first set of operations, such as 406, 409, 412, 415, 418, 421, 424, and/or 430. For example, the first processing component may be configured to extract an input/output (I/O) operation from a packet received over an I/O pipeline.

The first processing component may be configured to determine that an address associated with the I/O operation exists in a lookup table that is provided for thin provisioning of the at least one storage device.

The first processing component may be configured to perform one or more RAID calculations associated with the at least one storage device based on the address and the I/O operation. The first processing component may be configured to perform the one or more RAID calculations based on the dynamically allocated address. The first processing component may be configured to access the at least one storage device to perform the I/O operation based on the one or more RAID calculations.

The above-discussed two processing components of the device, such as a DPU, may comprise a second processing component configured to carry out a set of operations that occur when the address associated with the I/O operation does not exist in the lookup table. For example, the second processing component may be configured to return zeroes when the I/O operation comprises a read request and to dynamically allocate an address to the I/O operation and add the dynamically allocated address to the lookup table when the I/O operation comprises a write request.

The second processing component may be configured to carry out a set of operations that occur when the one or more RAID calculations indicate an error. The second processing component may be configured to carry out a set of operations that occur when the I/O operation fails upon the first processing component accessing the at least one storage device. The second processing component may be configured to carry out a set of operations that occur when a mapping of a namespace of the I/O operation fails.

Throughout operation, such as in the performance of the methods 400 and/or 500 described above, an accelerator of the DPU and one or more APIs of the DPU may be configured to respond in particular ways in response to detection of an event. For example, if an accelerator 321 detects the occurrence of a timeout or a PCI error from one or more disks, the accelerator 321 may be configured to alert one or more APIs in software stack 303 and/or instruct the one or more APIs to update a RAID state in hardware. If the accelerator 321 identifies an instruction to write data to an unallocated chunk, the accelerator 321 may be configured to alert one or more APIs which may allocate chunk mapping in response. If one or more APIs in software stack 303 identify the occurrence of failover, such as from a helix dual controller, the one or more APIs may deallocate an entire thin provisioning chunk mapping from an active controller in response. Similarly, if one or more APIs in software stack 303 identify the occurrence of a TRIM command, the one or more APIs may deallocate a thin provisioning chunk mapping from an active controller in response. Finally, if one or more APIs in software stack 303 identify the occurrence of a rebuild command, the one or more APIs may be configured to update a RAID state in hardware in response.

As may be appreciated, FIGS. 4 and 5 describe cooperation between the accelerator 321 and software stack 303 for carrying read and/or write commands, for example, within the context of thin provisioning. However, the accelerator 321 and/or the software stack 303 may handle other types of commands, such as a command to write zeros, a TRIM or deallocate command, a flush command, and/or a command to rebuild a RAID.

A command to write zeros may be handled by the accelerator 321 by skipping from operation 403 to 424 in FIG. 4 to overwrite an entire disk in a RAID with zeros, effectively wiping all data from the disk. A TRIM command is similar to the write zeros command except that a TRIM command writes zeros to a block of memory of a disk instead of the entire disk. A TRIM command may be a NVMe Dataset Management (DSM) command comprising a list up to 256 entries with each entry identifying a range of memory addresses. A DSM command for deallocating memory may occur when data in a block of memory is no longer needed. An API in the software stack 303 may lock a chunk of data and wait for completion of other committed I/O operations. Once committed I/O operations are complete, the software stack 303 may un-map the data chunk and provide the accelerator 321 with an instruction to execute deallocation on the block of memory. A flush command may be passed by the accelerator 321 to all disks and the software stack 303 may return a response capsule indicating a success or failure of the command depending on whether the flush succeeded on all targeted disks.

Any of the steps, functions, and operations discussed herein can be performed continuously and/or automatically.

The exemplary systems and methods of this disclosure have been described in relation to communication devices, multiple-device access environments, and communication systems. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein. For instance, while described in conjunction with client-server networks (e.g., conferencing servers, client devices, etc.), it should be appreciated that the components, systems, and/or methods described herein may be employed as part of a peer-to-peer network or other network. As can be appreciated, in a peer-to-peer network, the various components or systems described in herein may be part of one or more endpoints, or computers, participating in the peer-to-peer network.

Furthermore, while the exemplary embodiments illustrated herein show the various components of the system collocated, certain components of the system can be located remotely, at distant portions of a distributed network, such as a LAN and/or the Internet, or within a dedicated system.

Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

While flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, disclosed methods may be readily implemented in conjunction with software using object or object-oriented software development environments that provide portable source code that can be used on a variety of computer or workstation platforms. Alternatively, disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, sub combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a device comprising: a processing component configured to: receive an input/output (I/O) operation from an I/O pipeline, the I/O operation comprising either a read request to read data from at least one storage device or a write request to write data to the at least one storage device; determine that an address associated with the I/O operation exists in a lookup table that is provided for dynamic storage allocation within the at least one storage device; determine an address within the at least one storage device based on the address associated with the I/O operation; and generate an I/O command to either read data from or write data to the address within the at least one storage device.

Aspects of the above device include wherein the I/O pipeline is one of multiple possible types of I/O pipelines.

Aspects of the above device include wherein the processing component comprises a separate software component for each type of I/O pipeline.

Aspects of the above device include wherein each separate software component comprises an application programming interface (API).

Aspects of the above device include wherein the multiple possible types of I/O pipelines include a pipeline for NVMeOF I/O operations, a pipeline for thin provisioning I/O operations, a pipeline for RAID I/O operations, and a pipeline for NVMe bdev I/O operations.

Aspects of the above device include wherein the processing component is configured to determine the address within the at least storage device with static address translation using the address associated with the I/O operation.

Aspects of the above device include wherein the processing component is configured to issue the I/O command to the at least one storage device to carry out the I/O operation.

Aspects of the above device include wherein the processing component is configured to construct an I/O response message upon completion of the I/O operation and send the I/O response message to a client device that sent the packet.

Aspects of the above device include wherein the processing component is configured to perform one or more RAID calculations associated with the at least one storage device based on the address and the I/O operation, wherein the I/O command is based on the one or more RAID calculations.

Embodiments include a device comprising: a first processing component configured to carry out a first set of operations that includes: extracting an input/output (I/O) operation from a packet received over an I/O pipeline, the I/O operation comprising either a read request to read data from at least one storage device or a write request to write data to the at least one storage device; determining that an address associated with the I/O operation exists in a lookup table that is provided for thin provisioning of the at least one storage device; performing one or more RAID calculations associated with the at least one storage device based on the address and the I/O operation; and accessing the at least one storage device to perform the I/O operation based on the one or more RAID calculations; and a second processing component configured to carry out a second set of operations that occur when the address associated with the I/O operation does not exist in the lookup table.

Aspects of the above device include wherein the second processing component is configured to carry out a third set of operations that occur when the one or more RAID calculations indicate an error.

Aspects of the above device include wherein the second processing component is configured to carry out a fourth set of operations that occur when the I/O operation fails upon the first processing component accessing the at least one storage device.

Aspects of the above device include wherein the second processing component is configured to carry out a fifth set of operations that occur when a mapping of a namespace of the I/O operation fails.

Aspects of the above device include wherein the second set of operations includes returning zeroes when the I/O operation comprises the read request.

Aspects of the above device include wherein the second set of operations includes dynamically allocating an address to the I/O operation and adding the dynamically allocated address to the lookup table when the I/O operation comprises the write request.

Aspects of the above device include wherein the first processing component performs the one or more RAID calculations based on the dynamically allocated address.

Embodiments include a system comprising: a central processing unit (CPU); an array of storage devices coupled to the CPU; and a device configured to handle input/output (I/O) operations on behalf of the CPU, the I/O operations including read requests to read data from the array of storage devices and write requests to write data to the array of storage devices, wherein the device includes: a first processing component configured to carry out a first set of operations that includes: extracting an I/O operation from a packet received over an I/O pipeline; determining that an address associated with the I/O operation exists in a lookup table that is provided for thin provisioning of the array of storage devices; performing one or more RAID calculations associated with the array of storage devices based on the address and the I/O operation; and accessing the array of storage devices to perform the I/O operation based on the one or more RAID calculations; and a second processing component configured to carry out a second set of operations that occur when the address associated with the I/O operation does not exist in the lookup table.

Aspects of the above system include wherein the second set of operations includes dynamically allocating an address to the I/O operation and adding the dynamically allocated address to the lookup table when the I/O operation comprises a write request.

Aspects of the above system include wherein the first processing component performs the one or more RAID calculations based on the dynamically allocated address.

Aspects of the above system include wherein the second set of operations includes returning zeroes when the I/O operation comprises a read request.

Any one or more of the aspects/embodiments as substantially disclosed herein. Any one or more of the aspects/embodiments as substantially disclosed herein optionally in combination with any one or more other aspects/embodiments as substantially disclosed herein. One or means adapted to perform any one or more of the above aspects/embodiments as substantially disclosed herein.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," "compute," and variations thereof, as used herein, are used interchangeably, and include any type of methodology, process, mathematical operation, or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Methods described or claimed herein can be performed with traditional executable instruction sets that are finite and operate on a fixed set of inputs to provide one or more defined outputs. Alternatively, or additionally, methods described or claimed herein can be performed using AI, machine learning, neural networks, or the like. In other words, a system or server is contemplated to include finite instruction sets and/or artificial intelligence-based models/neural networks to perform some or all of the steps described herein.

What is claimed is:

1. A device comprising:
   a software stack comprising application programming interfaces (APIs), wherein each API is associated with a different I/O pipeline of multiple I/O pipelines and enables a single respective type of I/O memory operation from among a plurality of types of I/O memory operations available to the respective pipeline to be performed on behalf of a client device; and
   a processing component that isolates at least one storage device from the software stack, the processing component being configured to:
      receive an input/output (I/O) memory operation over a first I/O pipeline of the multiple I/O pipelines and via a first API of the software stack used for the first I/O pipeline, the I/O memory operation comprising either a read request to read data from the at least one storage device on behalf of the client device or a write request to write data to the at least one storage device on behalf of the client device;
      determine that an address associated with the I/O memory operation exists in a lookup table that is provided for dynamic storage allocation within the at least one storage device; determine an address within the at least one storage device based on the address associated with the I/O memory operation;
      generate an I/O memory command to either read data from or write data to the address within the at least one storage device; and
      in the event of an error that occurs subsequent to receiving the I/O memory operation, pass the I/O memory operation off to the first API for the first API to resolve or report the error.

2. The device of claim 1, wherein the multiple I/O pipelines include a pipeline for NVMeOF I/O memory operations, a pipeline for thin provisioning I/O memory operations, a pipeline for RAID I/O memory operations, and a pipeline for NVMe bdev I/O memory operations.

3. The device of claim 1, wherein the processing component is configured to determine the address within the at least one storage device with static address translation using the address associated with the I/O memory operation.

4. The device of claim 1, wherein the processing component is configured to issue the I/O memory command to the at least one storage device to carry out the I/O memory operation.

5. The device of claim 4, wherein the processing component is configured to construct an I/O response message upon completion of the I/O memory operation and send the I/O response message to the client device.

6. The device of claim 1, wherein the processing component is configured to perform one or more RAID calculations associated with the at least one storage device based on the address and the I/O memory operation, and wherein the I/O memory command is based on the one or more RAID calculations.

7. A device comprising:
   a software stack comprising application programming interfaces (APIs), wherein each API is associated with a different I/O pipeline of multiple I/O pipelines and enables a single respective type of I/O memory operation from among a plurality of types of I/O memory operations available to the respective pipeline to be performed on behalf of a client device; and
   a first processing component that isolates at least one storage device from the software stack, the first processing component being configured to carry out a first set of operations that includes:
      extracting an input/output (I/O) memory operation from a packet received over a first I/O pipeline of the multiple I/O pipelines and via a first API of the software stack used for the first I/O pipeline, the I/O memory operation comprising either a read request to read data from the at least one storage device on behalf of the client device or a write request to write data to the at least one storage device on behalf of the client device;
      determining that an address associated with the I/O memory operation exists in a lookup table that is provided for thin provisioning of the at least one storage device;
      performing one or more RAID calculations associated with the at least one storage device based on the address and the I/O memory operation;
      accessing the at least one storage device to perform the I/O memory operation based on the one or more RAID calculations; and
      determining that an error has occurred when the address associated with the I/O memory operation does not exist in the lookup table, and passing the I/O memory operation off to the software stack for the software stack to carry out a second set of operations, wherein the second set of operations includes the first API resolving or reporting the error.

8. The device of claim 7, wherein the software stack is configured to carry out a third set of operations that occur when the one or more RAID calculations indicate an error.

9. The device of claim 7, wherein the software stack is configured to carry out a fourth set of operations that occur when the I/O memory operation fails upon the first processing component accessing the at least one storage device.

10. The device of claim 7, wherein the software stack is configured to carry out a fifth set of operations that occur when a mapping of a namespace of the I/O memory operation fails.

11. The device of claim 7, wherein the second set of operations includes returning zeroes when the I/O memory operation comprises the read request.

12. The device of claim 7, wherein the second set of operations includes dynamically allocating an address to the I/O memory operation and adding the dynamically allocated address to the lookup table when the I/O memory operation comprises the write request.

13. The device of claim 12, wherein the first processing component performs the one or more RAID calculations based on the dynamically allocated address.

14. A system comprising:
   a central processing unit (CPU);
   an array of storage devices coupled to the CPU; and a device configured to handle input/output (I/O) memory operations offloaded by the CPU, the I/O memory operations including read requests to read data from the array of storage devices on behalf of a client device and write requests to write data to the array of storage devices on behalf of the client device, wherein the device includes:
    a software stack comprising application programming interfaces (APIs), wherein each API is associated with a different I/O pipeline of multiple I/O pipelines and enables a single respective type of I/O memory operation from among a plurality of types of I/O memory operations available to the respective pipeline to be performed on behalf of the client device;
    a first processing component that isolates the array of storage devices from the software stack, the first processing component being configured to carry out a first set of operations that includes:
        extracting an I/O memory operation from a packet received over a first I/O pipeline of the multiple I/O pipelines and via a first API of the software stack used for the first I/O pipeline;
        determining that an address associated with the I/O memory operation exists in a lookup table that is provided for thin provisioning of the array of storage devices;
        performing one or more RAID calculations associated with the array of storage devices based on the address and the memory I/O operation;
        accessing the array of storage devices to perform the I/O memory operation based on the one or more RAID calculations; and
        determining that an error has occurred when the address associated with the I/O memory operation does not exist in the lookup table, and passing the I/O memory operation off to the software stack for the software stack to carry out a second set of operations, wherein the second set of operations includes the first API resolving or reporting the error.

15. The system of claim 14, wherein the second set of operations includes dynamically allocating an address to the I/O memory operation and adding the dynamically allocated address to the lookup table when the I/O memory operation comprises a write request.

16. The system of claim 15, wherein the first processing component performs the one or more RAID calculations based on the dynamically allocated address.

17. The system of claim 15, wherein the second set of operations includes returning zeroes when the I/O memory operation comprises a read request.

* * * * *